United States Patent [19]

Giguere et al.

[11] Patent Number: 4,647,829
[45] Date of Patent: Mar. 3, 1987

[54] MEANS AND METHOD FOR STEPPING MOTOR STABILIZATION

[75] Inventors: Irving J. Giguere, Bristol; Thomas R. Gianni, Middletown, both of Conn.

[73] Assignee: The Superior Electric Company, Bristol, Conn.

[21] Appl. No.: 772,124

[22] Filed: Sep. 3, 1985

[51] Int. Cl.[4] .............................................. H02P 8/00
[52] U.S. Cl. .................................... 318/696; 318/685
[58] Field of Search ................ 318/696, 685; 363/124

[56] References Cited

U.S. PATENT DOCUMENTS 3,885,210  5/1975  Burnett ................................ 318/696

Primary Examiner—William M. Shoop, Jr.
Assistant Examiner—Saul M. Bergmann
Attorney, Agent, or Firm—John H. Crozier

[57] ABSTRACT

A mid-range stabilization circuit for use in a multiphase stepping motor control system having motor current controllers responsive to first and second reference signal inputs, the current controllers providing a level of current to the motor phases proportional to the reference signals. The stabilization circuit includes means for measuring the levels of the reference signals and means for limiting the levels of the reference signals such that the motor current controllers can provide current chopping when the motor is operating at a mid-range velocity.

9 Claims, 5 Drawing Figures

MEANS AND METHOD FOR STEPPING MOTOR STABILIZATION

BACKGROUND OF THE INVENTION

1. Field of the Invention

This invention relates to the control of stepping motors and, more particularly, to a novel means and method for reducing the mid-velocity instabilities of such motors when driven by a chopping drive.

2. Background Art

Stepping motors are well known devices for providing incremental motion and are widely used in applications where accurate positioning is required. Such a motor includes a rotor and a stator, with the stator having a plurality of salient poles energized by the passage of electric current through coils wound upon the poles. The coils are so arranged as to provide at least two electrical phases. The rotor includes at least one pair of N-S poles which are flux-linked with the stator poles, so that successive energizations of the phases provide incremental, or stepwise, rotary motion of the rotor.

Stepping motors and their drive systems frequently exhibit instabilities in the form of torque modulation at the motor shaft, with this phenomenon generally occurring at speeds between 1000 and 4000 steps per second. The exact range depends on the motor, the motor drive system, and the load being driven. In the range of instability, the motor's torque versus speed characteristic exhibits abrupt decreases in torque and in extreme cases may even lose synchronism and stall. One approach to reducing this mid-range instability has been to mechanically damp the shaft. This is satisfactory in some applications, but is generally disadvantageous, as mechanical damping decreases the amount of useful torque available.

In U.S. Pat. No. 4,081,736, assigned to the assignee of the present invention, there is described a digital circuit for providing mid-range stability in stepping motors. That circuit measures the extent of decay current after a change of energization and either increases or decreases the time interval before the next energization, depending on whether the rotor is moving at a greater or lesser velocity, respectively, than the stator field velocity. That circuit has been found satisfactory, but requires a microprocessor for operation.

SUMMARY OF THE INVENTION

The present invention provides a simpler means and method for mid-range stabilization, not requiring a microprocessor, and which satisfactorily stabilizes a stepping motor system over its middle range of velocities. This is accomplished by modifying the profile of the current that the motor receives.

DETAILED DESCRIPTION OF THE PREFERRED EMBODIMENT

Figure 1:
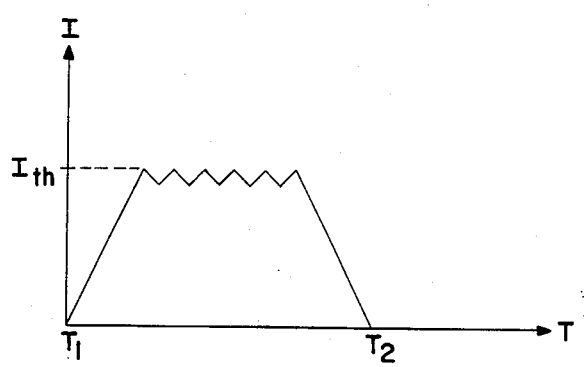
FIG. 1 shows the current profile of a stepping motor operating below mid-range.

Referring to the Drawing, FIG. 1 shows graphically in terms of current ("I") versus time ("T") in one phase of a stepping motor a full step of the motor's rotor when the motor is operated below mid-range, or the range of instability. The full step takes place between times "$T_1$" and "$T_2$", with "$I_{th}$" being the maximum current reached. The sawtoothed section at the top of the profile results from current chopping in the motor drive. Normally, a stepping motor system is relatively stable when this current profile exists.

Figure 2A:
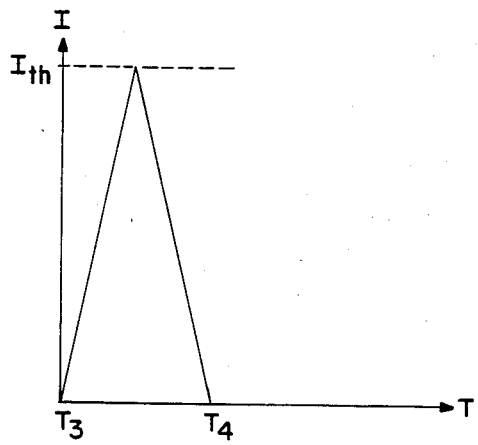
FIG. 2(a) shows the current profile of a stepping motor operation in its mid-range.

FIG. 2(a) shows a single-step current profile of a stepping motor with a conventional drive in the motor's range of instability. Here, the pulses driving the motor are so rapid that chopping is unable to take effect. It has been found that it is this type of motor profile that leads to the instability problems discussed above.

Figure 2B:
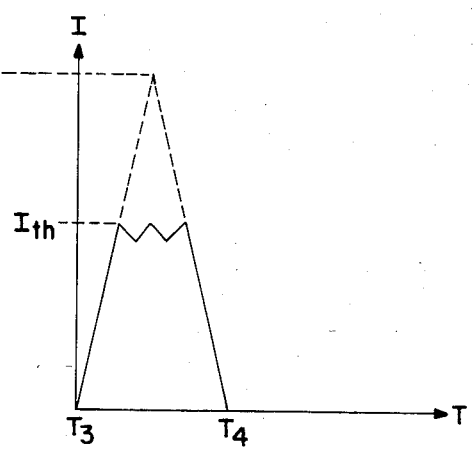
FIG. 2(b) shows the current profile of FIG. 2(a) modified according to the present invention.

FIG. 2(b) illustrates how the current profile is modified using the present invention. Here, the level of the maximum current "$I_{th}$" has been reduced sufficiently to permit chopping and thus overcome the problems of instability. At motor velocities above the mid-range, the current profile becomes nearly sinusoidal due to the back EMF generated by the motor and the motor is stable, even though, at these higher velocities, the pulse rate is so great that chopping cannot be employed.

Figure 3:
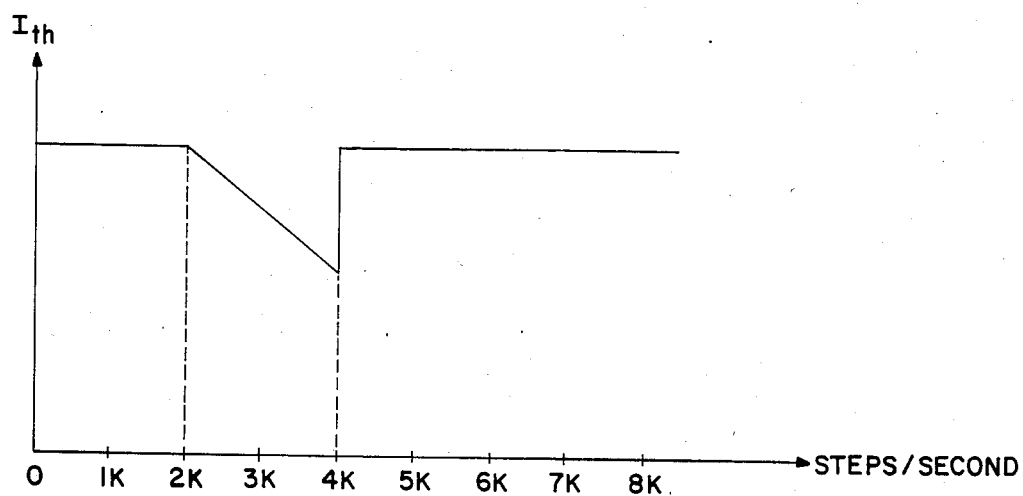
FIG. 3 is a graph of motor speed versus maximum current in a motor operated according to the present invention.

FIG. 3 shows graphically how the present invention might be applied to a stepping motor having an instability range over the velocities of 2000 to 4000 steps per second. It can be seen that the invention is applied to begin to decrease the value of "$I_{th}$" at 2000 steps per second and progressively decreases that value as motor speed increases until, at 4000 steps per second, "$I_{th}$" is returned to its maximum value.

Figure 4:
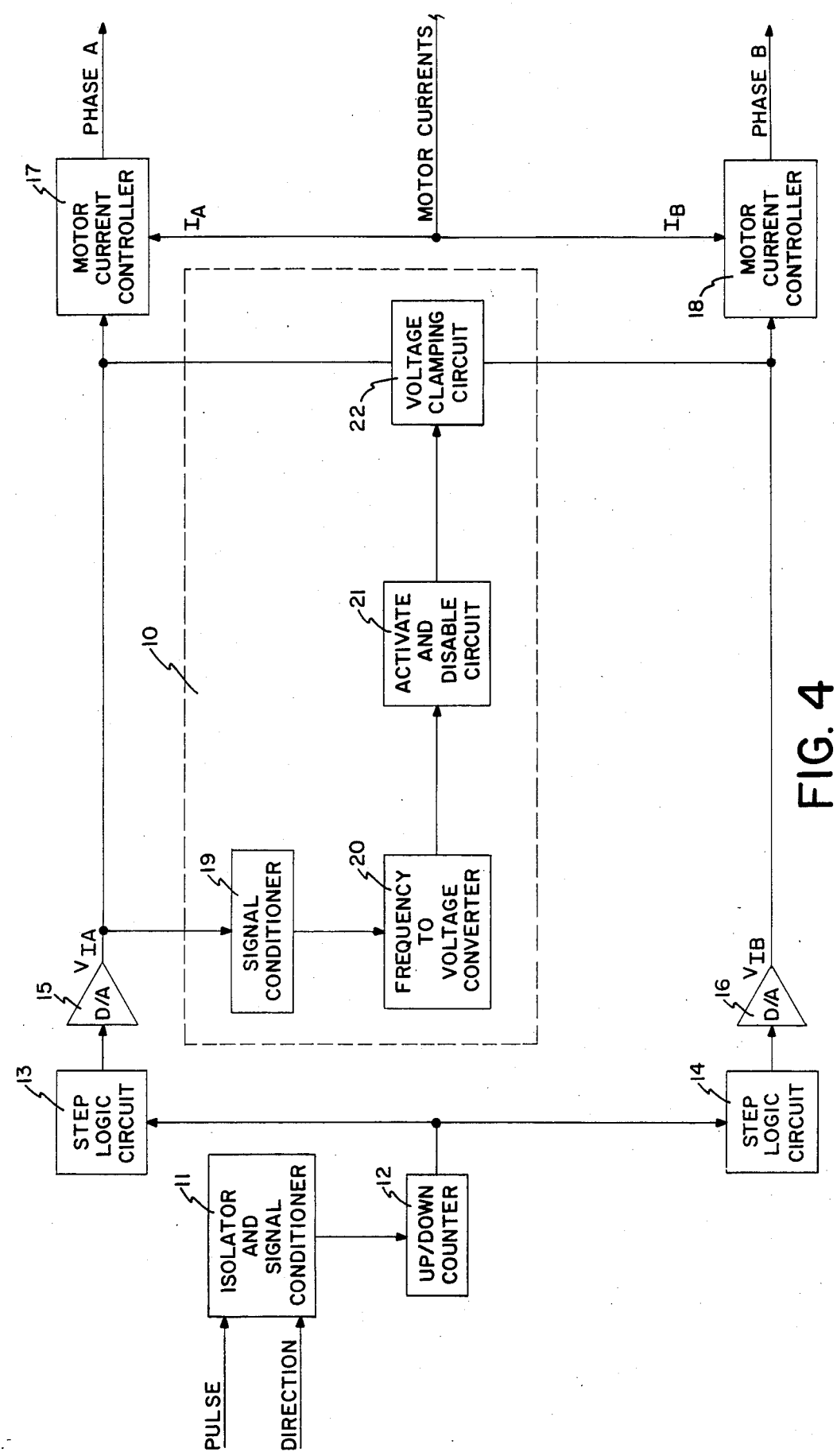
FIG. 4 is a block diagram of the present invention.

FIG. 4 is a block diagram of the present invention 10 employed in a two-phase stepping motor drive system. In the conventional portion of the system, an isolator and signal conditioner 11 receives pulse and direction information as inputs and provides an input to an up-/down counter 12 the output of which depends on whether the motor is to rotate clockwise or counterclockwise. The output of the up/down counter 12 is the input to step logic circuits 13 and 14 which determine the switching sequences of the motor phases. The digital outputs of the step logic circuits 13 and 14 are converted to analog reference signals "$V_{IA}$" and "$V_{IB}$", respectively, in digital-to-analog converters 15 and 16, respectively, and are the inputs to motor current controllers 17 and 18, respectively. The reference signals "$V_{IA}$" and "$V_{IB}$" are equal in magnitude but displaced in time. The motor current controllers 17 and 18 control the current level in the motor phases "A" and "B", respectively, and provide current chopping at low motor velocities.

The circuit of the present invention 10 includes a signal conditioner 19 the input of which is "$V_{IA}$". The output of the signal conditioner 19 is an input to a frequency-to-voltage converter which provides a voltage output proportional to the frequency of the input signal. The voltage output of the frequency-to-voltage converter 20 is the input to an activate and disable logic circuit 21 which, when the frequency of motor as indicated by the level of the reference signal "$V_{IA}$" is in the unstable range, provides an input to a voltage clamping circuit 22 which limits the levels of reference signals "$V_{IA}$" and "$V_{IB}$" so that the level of motor currents is correspondingly limited so that the current controllers 17 and 18 can provide chopping and thus stabilize the motor. The velocities at which activating and deactivating occur may be manually set depending on the motor being driven, or the limits may be built into the activate and disable circuit 22. As illustrated in FIG. 3, the levels of reference signals "$V_{IA}$" and "$V_{IB}$" would be increasingly limited as the velocity of the motor is increased through the range of instability.

It will be understood that what has been disclosed is a novel circuit and method for providing mid-range stabilization in a stepping motor. It will be further understood that, although the invention has been described as applied to a two-phase stepping motor, it may be applied as well to any multiphase stepping motor having other than two phases.

Since certain changes may be made in carrying out the above invention without departing from the scope thereof, it is intended that all matter contained in the above description or shown in the accompanying Drawing shall be interpreted as illustrative and not in a limiting sense.

It is also intended that the following claims are intended to cover all of the generic and specific features of the invention herein described, and all statements of the scope of the invention which, as a matter of language, might be said to fall therebetween.

We claim:

1. In a multiphase stepping motor control system having motor current controllers responsive to reference signal inputs, the current controllers providing a level of current to the motor phases proportional to the reference signals, a method of providing for mid-range velocity stability of the motor, comprising:
   (a) measuring the level of the reference signals; and
   (b) limiting the levels of the reference signals such that the current controllers can provide current chopping when the motor is operating at a mid-range velocity.

2. In a two-phase stepping motor control system having first and second motor current controllers responsive to first and second reference signal inputs, respectively, the current controllers providing a level of current to the motor phases proportional to the reference signals, a method of providing for mid-range velocity stability of the motor, comprising:
   (a) measuring the level of the reference signals; and
   (b) limiting the levels of the reference signals such that the current controllers can provide current chopping when the motor is operating at a mid-range velocity.

3. In a multiphase stepping motor control system having motor current controllers responsive to reference signal inputs, the current controllers providing a level of current to the motor phases proportional to the reference signals, a circuit for providing for mid-range velocity stability of the motor, comprising:
   (a) means for measuring the level of the reference signals; and
   (b) means for limiting the levels of the reference signals such that the motor current controllers can provide current chopping when the motor is operating at a mid-range velocity.

4. The circuit of claim 3, wherein the means for limiting the levels of the reference signals comprises a voltage clamping circuit which receives an input from the means for measuring the level of the reference signals and which is connected to act on the reference signals.

5. The circuit of claim 4, wherein the means for measuring the levels of the reference signals comprises:
   (a) a signal conditioner having one of the reference signals as an input; and
   (b) a frequency-to-voltage converter having the output of the signal conditioner as an input and providing an input to the voltage clamping circuit.

6. In a two-phase stepping motor control system having first and second motor current controllers responsive to first and second reference signal inputs, respectively, the current controllers providing a level of current to the motor phases proportional to the reference signals, a circuit for providing for mid-range velocity stability of the motor, comprising:
   (a) means for measuring the level of the reference signals; and
   (b) means for limiting the levels of the reference signals such that the motor current controllers can provide current chopping when the motor is operating at a mid-range velocity.

7. The circuit of claim 6, wherein the means for limiting the levels of the reference signals comprises a voltage clamping circuit which receives an input from the means for measuring the level of the reference signals and which is connected to act on the reference signals.

8. The circuit of claim 7, wherein the means for measuring the levels of the reference signals comprises:
   (a) a signal conditioner having one of the reference signals as an input; and
   (b) a frequency-to-voltage converter having the output of the signal conditioner as an input and providing an input to the voltage clamping circuit.

* * * * *